Oct. 9, 1923.

J. P. WALSH

DRY KILN

Filed Oct. 19, 1922

1,469,976

INVENTOR
JOSEPH PATRICK WALSH

BY Featherstonhaugh & Co

ATTORNEYS.

Patented Oct. 9, 1923.

1,469,976

UNITED STATES PATENT OFFICE.

JOSEPH PATRICK WALSH, OF VANCOUVER, BRITISH COLUMBIA, CANADA.

DRY KILN.

Application filed October 19, 1922. Serial No. 595,646.

*To all whom it may concern:*

Be it known that I, JOSEPH PATRICK WALSH, a resident of the city of Vancouver, in the Province of British Columbia, Canada, have invented certain new and useful Improvements in Dry Kilns, of which the following is a specification.

My invention relates to improvements in dry kilns and the object of the invention is to devise simple means which may be installed in existing kilns and which may be easily operated and automatically controlled for drying lumber without danger of checking or warping and without drying out the sap so rapidly as to permanently injure the material.

It consists essentially of air supply ducts running lengthwise of the kiln with apertures spaced apart longitudinally thereof to discharge the heated air into the kiln, and air return ducts with apertures similarly spaced to receive the cooled air and conduct it from the kiln.

A heating chamber with steam coils therein attached to a power driven blower for circulating the air from the returns to the supply ducts etc.

Steam coils placed in the supply ducts and a steam line running along each supply duct provided with jets arranged along its length to discharge wet steam to permeate the heated air supply with moisture as hereafter more particularly described.

In the drawings like characters of reference indicate corresponding parts in each figure.

Figure 1:
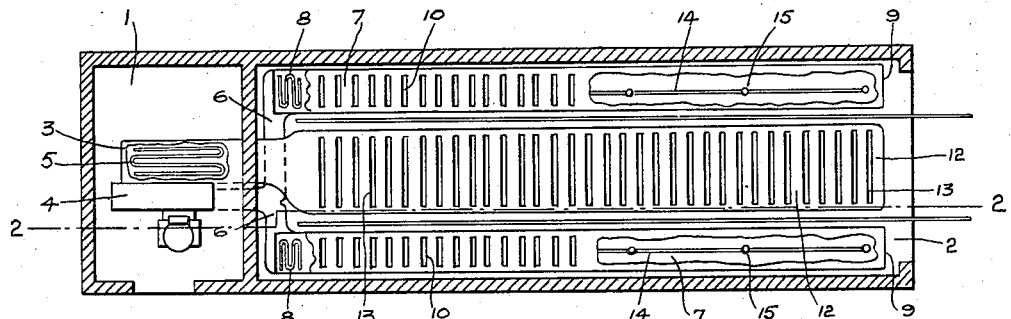
Fig. 1 is a plan of the kiln.
Figure 2:
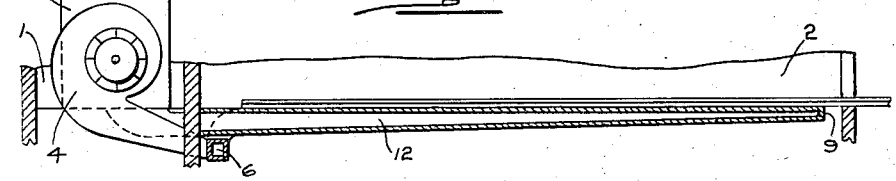
Fig. 2 is a sectional view showing the arrangement of the blower and the air ducts, taken on the line 2—2.

Numeral 1 designates a blower room which may be attached to the dry kiln room 2 as herein shown or the said blower and dry kiln rooms may be disposed in any other desired relative relation consistent with the purposes of the invention.

The heating chamber 3 is attached to blower 4 and has within it a series of steam coils 5 which are supplied with steam from any desired source.

The blower is mechanically driven and may be of any desired form and is connected by its downwardly projecting discharge duct to a lateral connection 6 and to the hot air supply ducts 7.

At the entrance to ducts 7 are arranged plurality of super-heating steam coils 8 which are supplied with steam from any desired source.

Ducts 7 are formed preferably rectangular in cross section with the bottom sloping upwards from the supply end towards the outer end, which latter is closed as at 9. The top surfaces of ducts 7 is provided with a plurality of rectangular apertures 10 extending virtually from side to side, such apertures being spaced apart and continuing for approximately the entire length of the ducts.

Figure 4:
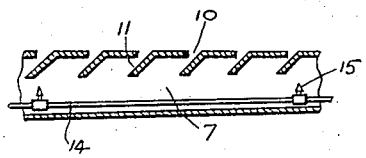
Fig. 4 is a longitudinal section of my air supply duct.

At one side of each aperture 10 is positioned a deflector plate 11, see Fig. 4, such deflector being attached to the underside of the cover of duct 7, and is set at an angle, with its lower extremity pointing opposite the direction of the flow of air through the ducts for the purpose of directing the flow of air from the blower upwards through each of the said apertures.

12 is a return duct extending substantially the full length of the kiln, it is rectangular in cross section and is formed with the bottom sloping upwards from the blower end in a similar manner to the supply ducts.

Rectangular apertures 13 are provided in the cover of the duct 12, which are spaced apart throughout the length of the duct, the length of the ducts running crosswise of the duct cover.

Steam conduits 14 are connected to the steam supply and extend along the bottoms of the ducts 7 being spaced preferably midway between their sides at regular intervals. Along said steam conduit T-connections are made to which are fitted steam jets 15 set vertically for the emission of wet steam into the current of hot air and also for the purpose of accelerating the passage of air and moisture through the apertures 10.

Disposed within the length of pipe lines supplying steam to the super-heating coils 8 is a diaphragm operated valve 16, which is actuated by compressed air or other suitable means from instrument board 17 in conjunction with a thermostatic bulb 18 set to project into the kiln through one of the walls thereof.

19 is a diaphragm operated valve on the pipe line conveying steam to conduits 14 and jets 15 within the hot air ducts 7, which is actuated by compressed air or other suitable means from instrument board 17 in conjunction with a thermostatic bulb or switch 20 preferably mounted on the ceiling of the kiln and also by a time clock mechanism to start or stop the moisture irrespective of the thermostatic control.

On the instrument board 17 are mounted a clock 21 and steam valve controlling instruments 22 and 23.

Figure 5:
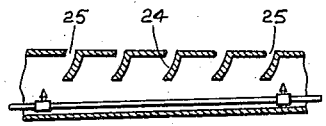
Fig. 5 is a longitudinal view showing a modification of same.

24 in Fig. 5, is a modified form of deflector plate attached to supply duct cover adjacent the aperture 25, such deflector being formed curving downwardy from the cover its lower edge pointing against the flow air along the duct.

I will now briefly describe the operation of my invention.

Figure 3:
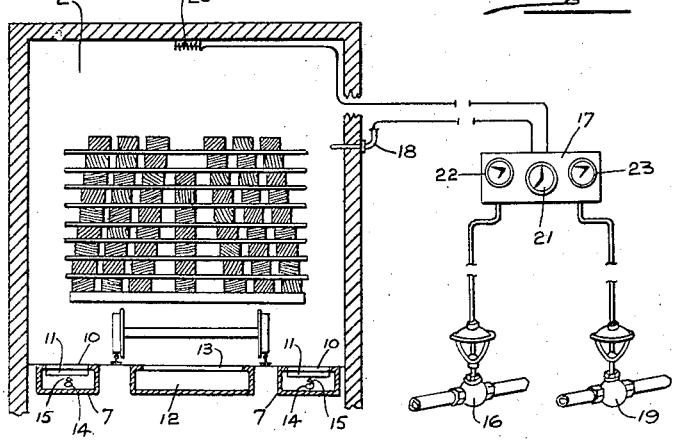
Fig. 3 is a sectional view of the kiln and thermostatic connections.

The lumber to be dried is run into the kiln on trucks running on rails in the usual way the lumber being spaced apart to allow for free circulation of air around the several pieces as illustrated in Fig. 3.

The steam controlling instruments are set to register a desired temperature and humidity, the steam is turned on and blower started.

Air is drawn by the blower through the primary heating coils 5 and passed along lateral duct 6, thence through coils 8 where it is heated to a temperature greater than the maximum set on control instrument 22 and passed along ducts 7 where it is impregnated with wet steam emanating from jets 15 which is set to discharge vertically upwards, have a tendency to drive the moistened hot air through the apertures 10.

The inclined bottoms of the ducts 7 and deflectors 11 attached to the cover of the ducts tend to cause a regular and even discharge of air through each of the said apertures throughout the length of the ducts.

The superheated and moistened air rapidly rises to the top of the kiln and in descending, through cooling and suction, the moisture condenses upon the lumber to be dried until the entire mass is raised to a temperature equivalent to the incoming air when it becomes vapourized and is retained in suspension in the air so long as the steam vapour is allowed to discharge therein.

On the air cooling and descending to the floor of the kiln it is drawn evenly downward along the entire length of the kiln through the apertures 13 of return duct 12 and into heating chamber 3, when the cycle is repeated.

From this description it will be seen that I have devised a kiln whereby lumber may be dried without checking or warping by impregnating the lumber with moisture or wet steam in such a manner as to first partially saturate the material to be dried, while bringing it to the desired heat, and then by turning off the moisture by the manually or automatic controlled means, drying the material with dry heat so that such material is dried from the centre outward instead of as in kilns of common use, drying the material from its outer surface towards the centre thereof, so as to result in the checking or warping of the material and also in the sap drying out so rapidly as to permanently injure the material so dried.

What I claim as my invention is:

1. In a dry kiln, the combination with the drying chamber, of a heating chamber, ducts extending from the heating chamber forwardly through the drying chamber, a return duct, means for distributing the heated air from the forwardly extending ducts through the drying chamber of the kiln, and means for moistening such heated air as it passes through the ducts.

2. In a dry kiln, the combination with the drying chamber, of a heating chamber, ducts extending from the heating chamber forwardly through the drying chamber, a return duct, means for distributing the heated air from the forwardly extending ducts through the drying chamber of the kiln, means for moistening such heated air as it passes through the ducts, and automatic means for cutting off the moisture supply when the required temperature is reached.

3. In a dry kiln, the combination with the drying chamber of a kiln, of a heating chamber, a blower fan connected to the heating chamber, a duct extending forwardly from the blower fan through the heating chamber, a return duct extending longitudinally through the drying chamber to the heating chamber, means for distributing the heated air from the forwardly extending ducts, and means for moistening the air as it passes through such forwardly extending ducts.

4. In a dry kiln, the combination with a drying kiln, of heated air supplying ducts and a supply duct and return duct each having slit openings extending crosswise of the top thereof having forwardly deflected fins depending from the rearward edge of each slit opening, and a heating device for heating and circulating the air through the supply duct and back through the return duct to the heating source.

5. In a dry kiln, the combination with a drying chamber, of air supply ducts extending longitudinally of each side of the chamber and having air distributing openings in the upper wall thereof, a heating chamber and blower fan, a connecting duct connecting each of the supply ducts with the blower fan, a return duct having return openings in the upper wall thereof and leading to the heating chamber, and means for moistening the air as it is supplied to the drying chamber.

6. In a dry kiln, the combination with a drying chamber, of air supply ducts extending longitudinally of each side of the chamber and having air distributing openings in the upper wall thereof, a heating chamber and blower fan, a connecting duct connecting each of the supply ducts with the blower fan, a return duct having return openings in the upper wall thereof and leading to the heating chamber, a pipe extending longitudinally through the air supply ducts, and steam jets extending upwardly therefrom at suitable distances apart.

Dated at Vancouver, B. C., this 3rd day of October, 1922.

JOSEPH PATRICK WALSH.

Witnesses:
 J. J. JOHNSTON,
 ERNEST E. CARVER.